UNITED STATES PATENT OFFICE.

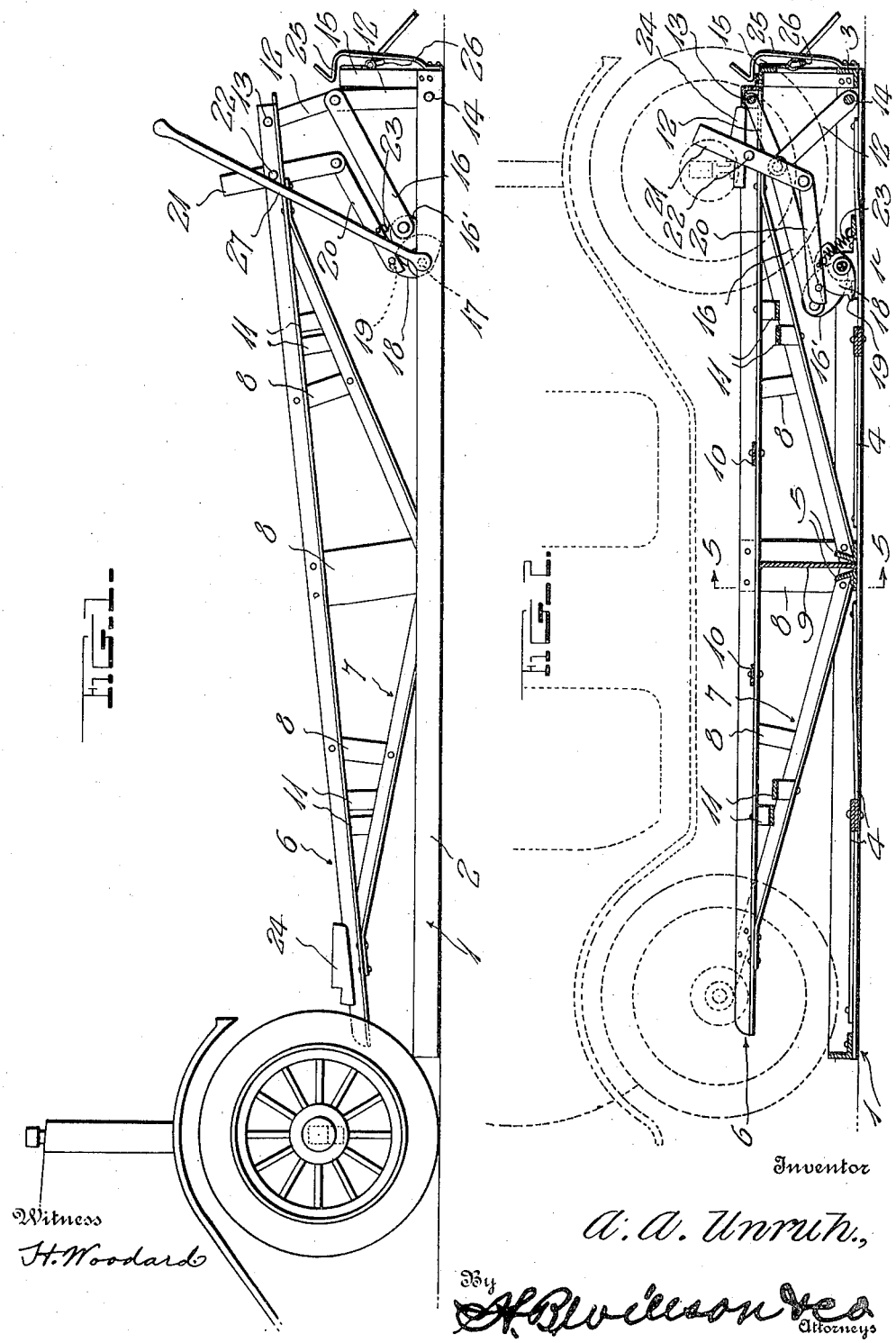

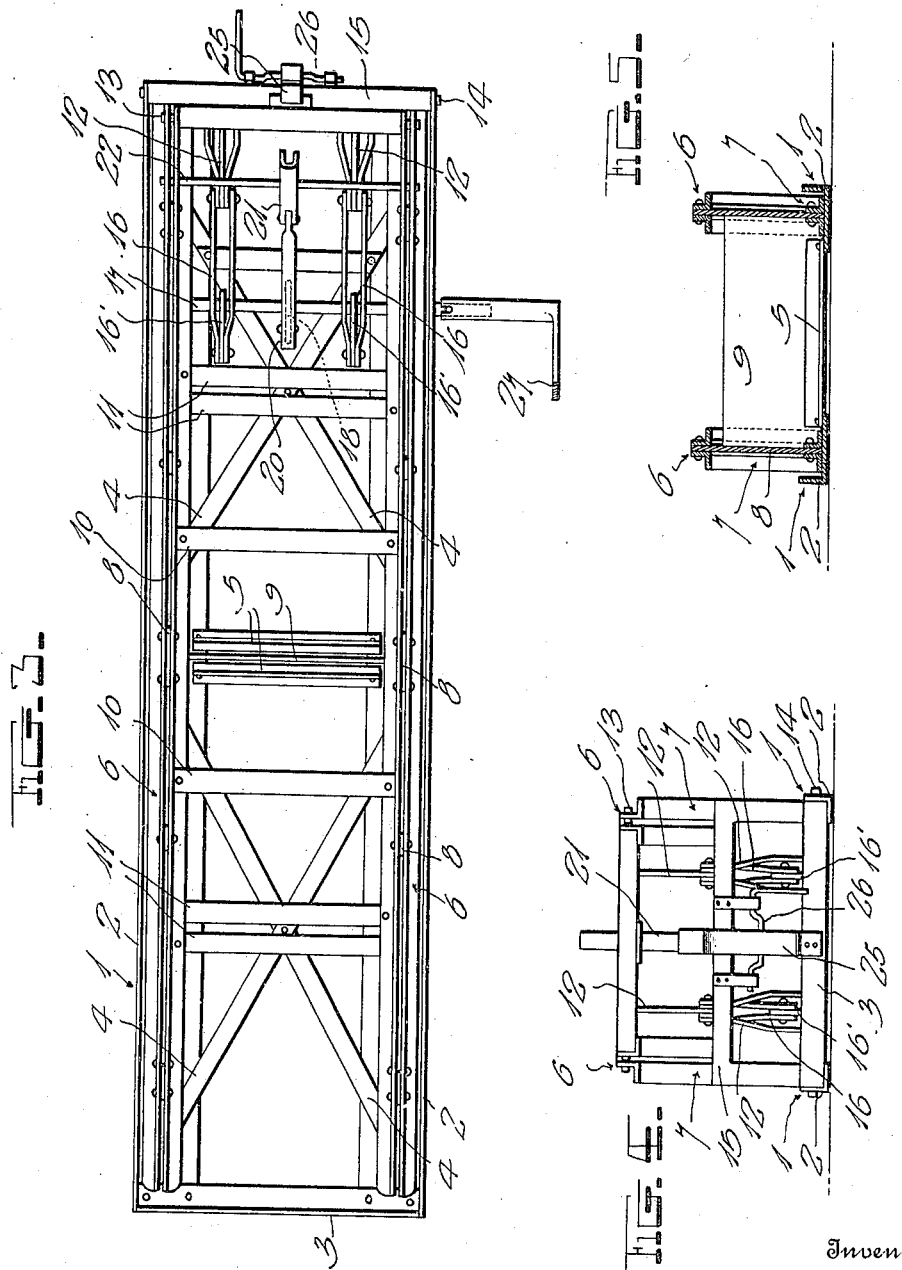

ALBERT A. UNRUH, OF PORTLAND, OREGON, ASSIGNOR OF ONE-FOURTH TO LEE M. UNRUH AND ONE-FOURTH TO CHARLES L. UNRUH, BOTH OF SALEM, OREGON.

AUTOMOBILE-LIFT.

1,325,968.   Specification of Letters Patent.   Patented Dec. 23, 1919.

Application filed April 28, 1919. Serial No. 293,069.

*To all whom it may concern:*

Be it known that I, ALBERT A. UNRUH, a citizen of the United States, residing at Portland, in the county of Multnomah and State of Oregon, have invented certain new and useful Improvements in Automobile-Lifts; and I do declare the following to be a full, clear, and exact description of the invention, such as will enable others skilled in the art to which it appertains to make and use the same.

My invention has for its object to provide a simply constructed and comparatively inexpensive device for use in garages, repair shops and the like, for jacking up automobiles and supporting their weight upon the axles, leaving the wheels and tires free, thereby not only relieving the tires of strain, but permitting free rotation of the wheels for repairing, cleaning, etc.

With the foregoing in view, the invention resides in the novel construction and arrangement of parts hereinafter fully described and claimed, reference being made to the accompanying drawings which form a part of this application.

Figure 1 is a side elevation of the lift showing an automobile partly on the same.

Fig. 2 is a longitudinal section showing the car completely on the lift.

Fig. 3 is a top plan view.

Fig. 4 is an end elevation.

Fig. 5 is a vertical transverse section on the plane indicated by the line 5—5 of Fig. 2.

In the drawings above briefly described, the numeral 1 designates a base frame which preferably consists of parallel side bars 2 of angle iron, angle iron end bars 3 connecting said side bars, diagonal braces 4, and a pair of closely spaced central bars 5, said last named bars being also preferably of angle iron with their ends suitably secured to the side bars 2.

Above the frame 1 are two parallel tracks 6 adapted to receive thereon the automobile axles. Each track is preferably composed of two angle iron bars as shown, and a V-shaped rocker 7, formed of angle iron or the like, is provided for each of said tracks, struts 8 being disposed between the tracks and rockers to suitably support the former from the latter. The rockers 7 rest on the inwardly extending flanges of the angle iron side bars 2 and the tracks and rockers are held against longitudinal shifting by a transverse plate 9 secured to the former and received between the bars 5. The struts and tracks are suitably connected by transverse bars 10 and braces 11.

At the front end of the device, so named because it supports the front end of the automobile, I provide two sets of toggle links 12 whose upper ends are pivoted to the tracks 6 by a rod or the like 13, while their lower ends are similarly connected at 14 to the frame 1. While the device is out of use, the toggle links 12 stand approximately vertical and slightly beyond dead center in contact with an extension 15 rising from the base frame 1, and said toggle links thus hold the tracks 6 in an inclined position for the purpose of allowing the automobile to be run onto the same, but when this has taken place, the links 12 must be moved to a released position to allow swinging of the tracks 6 to a horizontal position. In order that this may take place, I provide the construction described below.

Pitmen 16 are pivoted to the connected ends of the toggle links 12 and extend therefrom to crank arms 16' on a rock shaft 17 which extends transversely of and is mounted on the base frame 1. At its center, or at any other preferred location, the shaft 17 carries a disk 18 whose peripheral edge is provided with a projecting shoulder 19 which normally abuts the end of a push bar 20. The end of the bar 20, opposite the shoulder 19, is pivoted to the lower end of a trip lever 21 which is shown fulcrumed upon a rod 22 extending between the tracks 6, the upper end of said lever being in the path of the front axle of the automobile. The bar 20 is preferably of channel formation with its side flanges straddling the peripheral edge of the disk 18, and in most instances a coiled spring 23 will be provided for holding said bar downwardly against the disk.

By the construction just described, when the front axle of the automobile travels upwardly upon slides or the like 24 mounted on the tracks, and comes in contact with the lever 21, this lever will be rocked so that the bar 20 thrusts against the shoulder 19, thus turning the rock shaft 17 and pulling upon the pitman 16 to release the toggle links 12. Since the front end of the automobile is of greater weight than the rear end thereof, the tracks 6 are overbalanced and swung to a horizontal position, raising the rear wheels of the automobile above the floor of the garage or other building. The downward movement of the tracks 6 is limited by the extension frame 14 and to hold said tracks in horizontal position, a suitable spring catch 25 is preferably provided, said catch being releasable by means of a cam lever or the like 26.

When the device is idle, it stands in the inclined position of Fig. 1 with the slides 24 in position to receive the front axle of the automobile. When now the machine is run over the device, said front axle engages the slides and moves upwardly along the inclined tracks 6. By the time the rear axle of the machine has moved to a point above the rear ends of the tracks, the front axle strikes the trip lever 21, thereby releasing the toggle links 11 so that the weight of the front end of the machine will swing said tracks to the horizontal position disclosed in Fig. 2, in which position they are held against accidental movement by the catch 25. When the car is to be removed, a hand lever or the like 27 is used for turning the rock shaft 17 in such manner as to cause the pitmen 16 to vertically dispose the toggle links 12. The front end of the machine is thus raised and at the same time the rear wheels are lowered on the floor so that the car may be withdrawn from the lifter under its own power.

From the foregoing, taken in connection with the accompanying drawings, it will be seen that although my invention is of comparatively simple and inexpensive nature, it will be highly efficient and in every way desirable, but it is to be understood that within the scope of the invention as claimed, numerous changes may well be made, and in all forms of the invention I prefer to employ the toggle links 12 and their operating means, together with the novel mounting for the tracks 6, such mounting including the rockers 7, the plate 8 and the bars 5.

I claim:

1. In an automobile lift, a base, a pair of parallel tracks pivotally supported between their ends on said base and adapted to engage the automobile axles, toggle links connecting one end of said tracks with said base for holding said tracks in an inclined position while not in use, a transverse rock shaft mounted on said base, crank means on said rock shaft, pitmen connecting said crank means with said toggle links for moving the latter to released position to allow said tracks to move to a horizontal position, and means including a trip in the path of the automobile, for turning said shaft in a direction to release said toggle links when the machine reaches the limit of its forward movement.

2. In an automobile lift, a base, a pair of parallel tracks pivotally supported between their ends on said base and adapted to engage the automobile axles, toggle links connecting one end of said tracks with said base for holding said tracks in an inclined position while not in use, a transverse rock shaft mounted on said base, crank means on said rock shaft, pitmen connecting said crank means with said toggle links for moving the latter to released position to allow said tracks to move to a horizontal position, a lever carried by the aforesaid ends of said tracks and movable bodily therewith, the upper end of said lever being disposed in the path of the automobile, a disk on said rock shaft having a shoulder on its peripheral edge, and a push bar resting at one end on said disk edge in abutting relation with said shoulder, the other end of said push bar being pivoted to the lower end of said lever, whereby actuation of said lever by the automobile will turn said rock shaft in a manner to release said toggle links.

3. A structure as specified in claim 2, said push bar being of channel formation with its flanges straddling the edge of the disk.

4. In an automobile lift, a base including side bars and a pair of closely spaced parallel bars extending between them, tilting tracks for supporting the automobile, said tracks having rockers resting on said side bars, and a transverse plate extending between said rockers at the points of contact with said side bars and received between said closely spaced bars; together with means for tilting said frame.

5. In an automobile lever, a base including angle iron side bars and a pair of closely spaced parallel bars extending between them, tilting tracks for supporting the automobile, said tracks having rockers resting on one flange of said angle iron side bars and held against lateral movement by the other flanges of said side bars, and a transverse plate extending between said rockers at their points of contact with said side bars and received between said closely spaced bars; together with means for tilting said frame.

In testimony whereof I have hereunto set my hand.

ALBERT A. UNRUH.